(12) United States Patent
Casimer et al.

(10) Patent No.: US 9,356,867 B2
(45) Date of Patent: May 31, 2016

(54) LOSSLESS SOCKET-BASED LAYER 4 TRANSPORT (RELIABILITY) SYSTEM FOR A CONVERGED ETHERNET NETWORK

(71) Applicant: International Business Machines Corporation, Armonk, NY (US)

(72) Inventors: DeCusatis M. Casimer, Poughkeepsie, NY (US); Mircea Gusat, Langnau (CH); Ronald P. Luijten, Thawwil (CH); Cyriel J. A. Minkenberg, Gutenswil (CH); Fredy D. Neeser, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 13/708,933

(22) Filed: Dec. 8, 2012

(65) Prior Publication Data
US 2013/0205039 A1      Aug. 8, 2013

Related U.S. Application Data

(63) Continuation of application No. 13/366,640, filed on Feb. 6, 2012.

(51) Int. Cl.
G06F 15/16         (2006.01)
H04L 12/801        (2013.01)
H04L 12/825        (2013.01)

(52) U.S. Cl.
CPC ............ *H04L 47/10* (2013.01); *H04L 47/11* (2013.01); *H04L 47/193* (2013.01); *H04L 47/26* (2013.01)

(58) Field of Classification Search
CPC ......... H04L 12/56; H04L 47/10; H04L 47/11; H04L 47/193

USPC .......................................... 709/235, 230, 231
See application file for complete search history.

(56) References Cited

U.S. PATENT DOCUMENTS

| 6,426,944 | B1 * | 7/2002 | Moore | 370/236 |
|---|---|---|---|---|
| 2007/0081454 | A1 | 4/2007 | Bergamasco et al. | H04L 12/26 |
| 2009/0080334 | A1 | 3/2009 | DeCusatis et al. | G01R 31/08 |
| 2009/0252038 | A1 | 10/2009 | Cafiero et al. | H04L 12/26 |
| 2010/0223397 | A1 | 9/2010 | Elzur | 709/235 |
| 2011/0035474 | A1 * | 2/2011 | Elzur et al. | 709/221 |
| 2011/0035498 | A1 | 2/2011 | Shah et al. | 709/226 |
| 2011/0261686 | A1 | 10/2011 | Kotha et al. | 370/230 |

(Continued)

FOREIGN PATENT DOCUMENTS

EP     1936880 A1    6/2008    ............ H04L 12/56

OTHER PUBLICATIONS

Zhi-Hern Loh, Congestion management clears a path through 10 GbE, Electronics, Design, Strategy, News (EDN), Jan. 7, 2010.

*Primary Examiner* — Vivek Srivastava
*Assistant Examiner* — Normin Abedin
(74) *Attorney, Agent, or Firm* — Ido Tuchman; Steven Chiu

(57) ABSTRACT

A reliability system for a Converged Enhanced Ethernet network may include a plurality of end points each comprising a layer 4 transport layer, where each end point is connected to a data center bridging (DCB) layer 2 network. The system may also include an adaptor between the layer 4 transport layer and the DCB layer 2 network to translate at least one of flow and congestion control feedback signals, provided by at least one of the DCB network and the transport layer, to consolidated feedback signals for controlling transmission by the transport layer.

16 Claims, 12 Drawing Sheets

(56) References Cited

U.S. PATENT DOCUMENTS

2011/0261696 A1 10/2011 Crisan .......................... 370/235
2011/0261697 A1 10/2011 Crisan .......................... 370/235
2012/0020219 A1 1/2012 Kamiya et al. ................ 370/235
2012/0079065 A1 3/2012 Miyamoto .................... 709/217

\* cited by examiner

LOSSLESS SOCKET-BASED LAYER 4 TRANSPORT (RELIABILITY) SYSTEM FOR A CONVERGED ETHERNET NETWORK

CROSS-REFERENCE TO RELATED APPLICATIONS

This is a Continuation Application to U.S. patent application Ser. No. 13/366,640 entitled "LOSSLESS SOCKET-BASED LAYER 4 TRANSPORT (RELIABILITY) SYSTEM FOR A CONVERGED ETHERNET NETWORK", filed Feb. 6, 2012, which application is incorporated herein by reference.

BACKGROUND

The invention relates to the field of computer networking, and, more particularly, to Ethernet networks.

Converged Enhanced Ethernet (CEE) datacenters allow high link speeds and short delays while introducing lossless operation (and lossless traffic classes) by the means of link layer flow control (LL-FC, a.k.a. Priority Flow Control (PFC) in CEE) beyond the traditional lossy operation (lossy traffic classes). However, in contrast to the traditional Ethernet and Internet, the lossless operation of CEE introduces new challenges.

SUMMARY

According to one embodiment of the invention, a reliability system for a Converged Enhanced Ethernet network may include a plurality of end points each comprising a layer 4 transport layer, where each end point is connected to a data center bridging (DCB) layer 2 network. The system may also include an adaptor between the layer 4 transport layer comprising one or more protocols, such as TCP, UDP, RCP, DCCP, XCP, etc., and the DCB layer 2 network to translate at least one of flow and congestion control feedback signals, provided by at least one of the DCB network and the transport layer, to consolidated feedback signals for controlling transmission by the transport layer.

The DCB layer 2 network may generate flow control signals according to a flow control protocol supporting multiple priorities, such as Priority Flow Control (PFC). The DCB layer 2 network may generate congestion control feedback signals according to a quantized congestion notification (QCN) protocol. PFC and QCN can be individually or simultaneously enabled in the DCB layer 2 network. If both PFC and QCN are enabled, either one or both may be independently used by any end point.

The end point may be connected to the DCB layer 2 network through an end station, wherein the end station implements a quantized congestion notification (QCN) reaction point imposing rate limits based on a QCN protocol to limit network congestion in the DCB layer 2 network in response to receiving congestion control signals. The network traffic generated by the transport layer may be carried on layer 2 with lossy operation, either by configuring the end station to steer the traffic to a lossy priority of a priority flow control (PFC) protocol, or by not using any PFC protocol.

The network traffic generated by the transport layer may be carried on layer 2 with lossless operation, by configuring the end station to steer the traffic to a lossless priority of a priority flow control (PFC) protocol and by letting the end station react to layer 2 flow control messages generated by the adjacent switch. The network traffic generated by the transport layer may be carried on layer 2 with lossy operation, either by configuring the end station to steer the traffic to a lossy priority of a priority flow control (PFC) protocol, or by not using any PFC protocol.

The network traffic generated by the transport layer may be carried on layer 2 with lossless operation, by configuring the end station to steer the traffic to a lossless priority of a priority flow control (PFC) protocol and by letting the end station react to layer 2 flow control messages generated by an adjacent switch.] The adaptor may preprocess the flow and congestion control feedback signals into consolidated feedback signals, with the preprocessing including at least one of delaying, aggregating, filtering, replicating, enhancing and decimating the primary feedback signals.

The layer 4 transport layer may be a Transmission Control Protocol (TCP), RCP, XCP, DCCP, UDP or any socket-based transport scheme, herein named TCP. The interface may provide a reduced-rate consolidated feedback signal indicating congestion severity induced by a TCP flow, and in which the interface comprises a TCP congestion module for controlling TCP flow transmissions in response to the consolidated feedback signal.

The consolidated feedback signal may comprise at least one of a TCP flow rate limit, a TCP flow buffer occupancy metric, and a TCP flow rate limit for processing TCP ACKs [if existent, as UDP doesn't employ ACK] or Explicit Congestion Notifications (ECN) and for controlling associated TCP transmissions. The congestion module adjusts a TCP flow congestion window and transmission schedule in response to the consolidated feedback signal.

Another aspect of the invention is a reliability method for a Converged Enhanced Ethernet network. The method may include providing a plurality of end points each comprising a layer 4 transport layer, where each end point is connected to a data center bridging (DCB) layer 2 network. The method may also include positioning an adaptor between the layer 4 transport layer and the DCB layer 2 network to translate at least one of flow and congestion control feedback signals, provided by at least one of the DCB network and the transport layer, to consolidated feedback signals for controlling transmission by the transport layer.

The method may further include generating flow control signals at the DCB layer 2 network according to a flow control protocol supporting multiple priorities, such as Priority Flow Control (PFC). The method may additionally include generating congestion control feedback signals at the DCB layer 2 network according to a quantized congestion notification (QCN) protocol.

The method may also include connecting the end point to the DCB layer 2 network through an end station, where the end station implements a quantized congestion notification (QCN) reaction point imposing rate limits based on a QCN protocol to limit network congestion in the DCB layer 2 network in response to receiving congestion control signals. The method may further include carrying network traffic generated by the transport layer on layer 2 with lossy operation, either by configuring the end station to steer the traffic to a lossy priority of a priority flow control (PFC) protocol, or by not using any PFC protocol.

The method may additionally include carrying the network traffic generated by the transport layer on layer 2 with lossless operation, by configuring the end station to steer the traffic to a lossless priority of a priority flow control (PFC) protocol and by letting the end station react to layer 2 flow control messages generated by an adjacent switch. By switch we refer to any physical or virtual device that may be used for switching, bridging, steering, sorting, routing, forwarding, scheduling packets or Ethernet frames. The method may also include processing TCP ACKs and/or ECNs, and controlling associated TCP transmissions where the consolidated feedback signal comprises at least one of a TCP flow rate limit, a TCP flow buffer occupancy metric, and a TCP flow rate limit. The method may further include adjusting a TCP flow congestion window and transmission schedule in response to the consolidated feedback signal via the congestion module.

Another aspect of the invention is a computer readable program codes coupled to tangible media to address reliability in a converged Ethernet network. The computer readable program codes may be configured to cause the program to provide a plurality of end points each comprising a layer 4 transport layer, where each end point is connected to a data center bridging (DCB) layer 2 network. The computer readable program codes may also position an adaptor between the layer 4 transport layer and the DCB layer 2 network to translate at least one of flow and congestion control feedback signals, provided by at least one of the DCB network and the transport layer, to consolidated feedback signals for controlling transmission by the transport layer.

DETAILED DESCRIPTION

The invention will now be described more fully hereinafter with reference to the accompanying drawings, in which preferred embodiments of the invention are shown. Like numbers refer to like elements throughout, and like numbers with letter suffixes are used to identify similar parts in a single embodiment.

Figure 1:
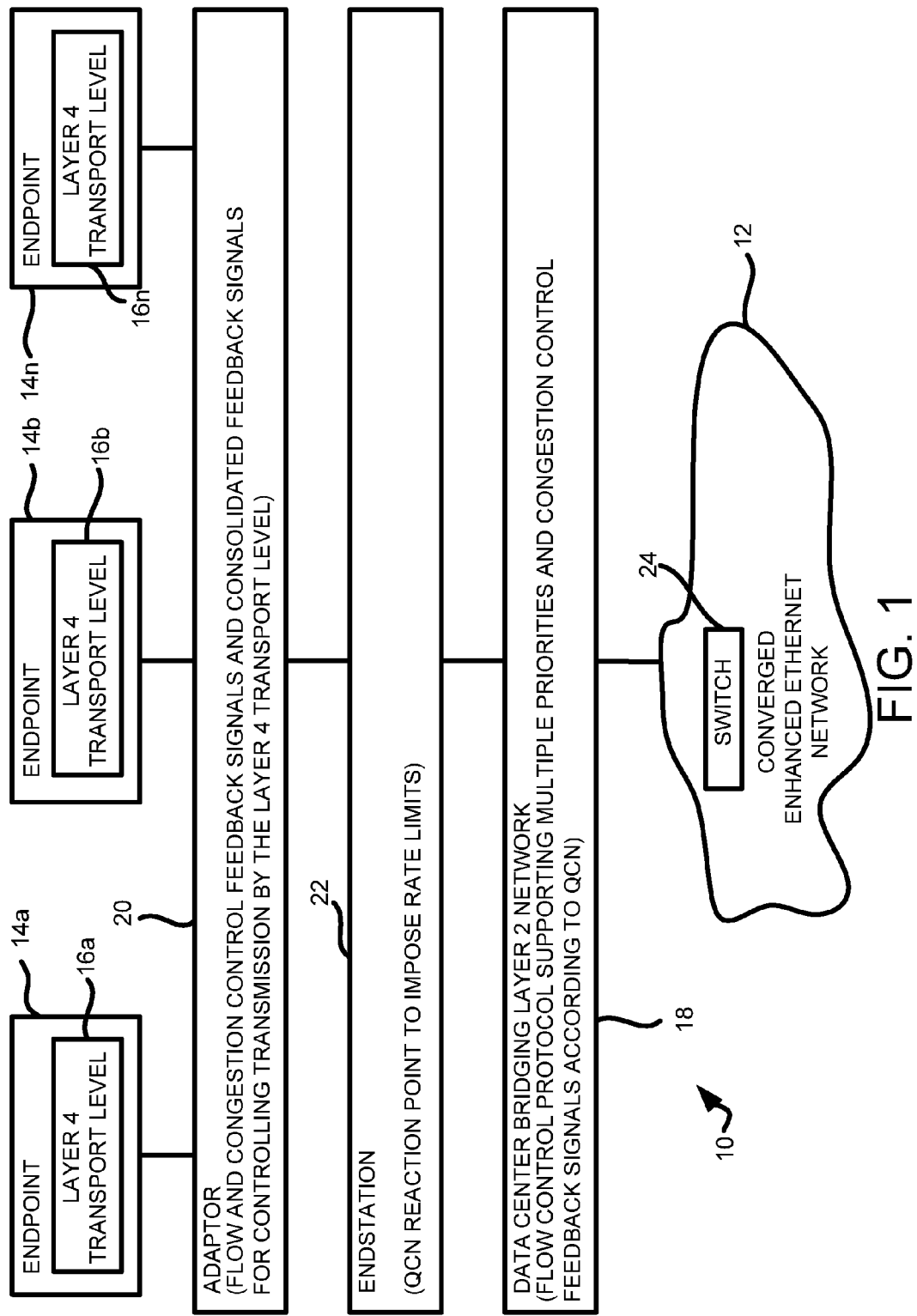
FIG. 1 is a block diagram illustrating a Converged Enhanced network in accordance with the invention.

With reference now to FIG. 1, a reliability system 10 for a Converged Enhanced Ethernet network 12 is initially described. In an embodiment, the system 10 includes a plurality of end points 14a-14n each comprising a layer 4 transport layer 16a-16n, where each end point is connected to a data center bridging (DCB) layer 2 network 18. The system 10 also includes an adaptor 20 between the layer 4 transport layer 16a-16n and the DCB layer 2 network 18 to translate at least one of flow and congestion control feedback signals, provided by at least one of the DCB network and the transport layer, to consolidated feedback signals for controlling transmission by the transport layer.

In one embodiment, the DCB layer 2 network 18 generates flow control signals according to a flow control protocol supporting multiple priorities, such as Priority Flow Control (PFC) and/or the like. In another embodiment, the DCB layer 2 network 18 generates congestion control feedback signals according to a quantized congestion notification (QCN) protocol.

In one embodiment, the end point 14a-14n is connected to the DCB layer 2 network 18 through an end station 22, wherein the end station implements a quantized congestion notification (QCN) reaction point imposing rate limits based on a QCN protocol to limit network congestion in the DCB layer 2 network in response to receiving congestion control signals. In another embodiment, the network traffic generated by the transport layer 16a-16n is carried on layer 2 18 with lossy operation, either by configuring the end station 22 to steer the traffic to a lossy priority of a priority flow control (PFC) protocol, or by not using any PFC protocol.

In one embodiment, the network traffic generated by the transport layer 16a-16n is carried on layer 2 18 with lossless operation, by configuring the end station to steer the traffic to a lossless priority of a priority flow control (PFC) protocol and by letting the end station 22 react to layer 2 flow control messages generated by the adjacent switch 24. In another embodiment, the network traffic generated by the transport layer 16a-16n is carried on layer 2 18 with lossy operation, either by configuring the end station 22 to steer the traffic to a lossy priority of a priority flow control (PFC) protocol, or by not using any PFC protocol.

In one embodiment, the network traffic generated by the transport layer 16a-16n is carried on layer 2 18 with lossless operation, by configuring the end station 22 to steer the traffic to a lossless priority of a priority flow control (PFC) protocol and by letting the end station react to layer 2 flow control messages generated by an adjacent switch 24. In another embodiment, the adaptor 20 preprocess the flow and congestion control feedback signals into consolidated feedback signals, with the preprocessing including at least one of delaying, aggregating, filtering, replicating, enhancing and decimating the primary feedback signals.

In one embodiment, the layer 4 transport layer 16a-16n is a Transmission Control Protocol (TCP) layer. In another embodiment, the adaptor 20 provides a reduced-rate consolidated feedback signal indicating congestion severity induced by a TCP flow, and in which the adaptor comprises a TCP congestion module for controlling TCP flow transmissions in response to the consolidated feedback signal.

The consolidated feedback signal may comprise at least one of a TCP flow rate limit, a TCP flow buffer occupancy metric, and a TCP flow rate limit for processing TCP ACKs and for controlling associated TCP transmissions. The congestion module adjusts a TCP flow congestion window and transmission schedule in response to the consolidated feedback signal.

Figure 2:
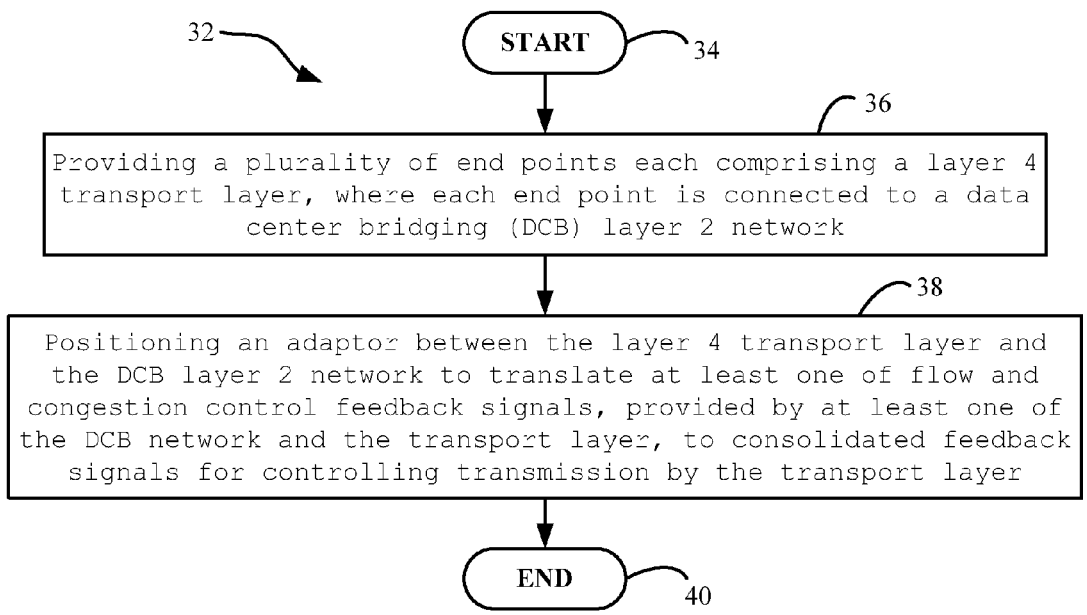
FIG. 2 is a flowchart illustrating method aspects according to the invention.

Another aspect of the invention is a reliability method for a Converged Enhanced Ethernet network, which is now described with reference to flowchart 32 of FIG. 2. The method begins at Block 34 and may include providing a plurality of end points each comprising a layer 4 transport layer, where each end point is connected to a data center bridging (DCB) layer 2 network at Block 36. The method may also include positioning an adaptor between the layer 4 transport layer and the DCB layer 2 network to translate at least one of flow and congestion control feedback signals, provided by at least one of the DCB network and the transport layer, to consolidated feedback signals for controlling transmission by the transport layer at Block 38. The method ends at Block 40.

Figure 3:
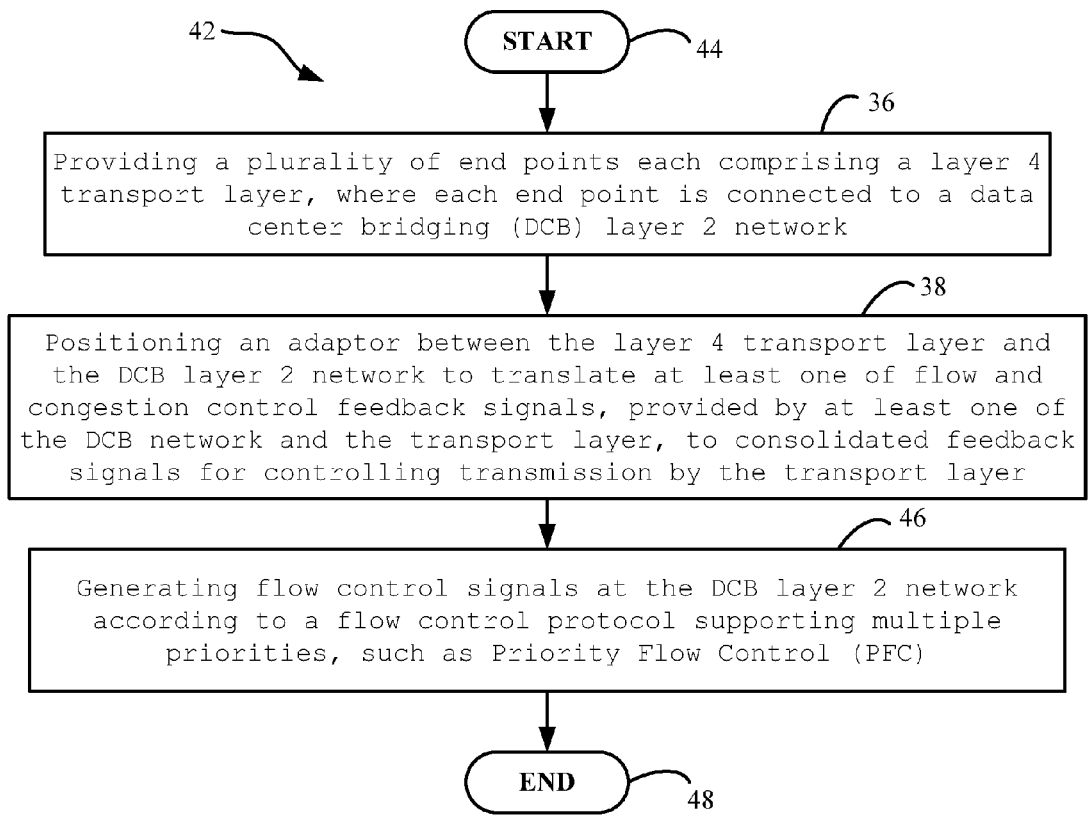
FIG. 3 is a flowchart illustrating method aspects according to the method of FIG. 2.

In another method embodiment, which is now described with reference to flowchart 42 of FIG. 3, the method begins at Block 44. The method may include the steps of FIG. 2 at Blocks 36 and 38. The method may further include generating flow control signals at the DCB layer 2 network according to a flow control protocol supporting multiple priorities, such as Priority Flow Control (PFC) at Block 46. The method ends at Block 48.

Figure 4:
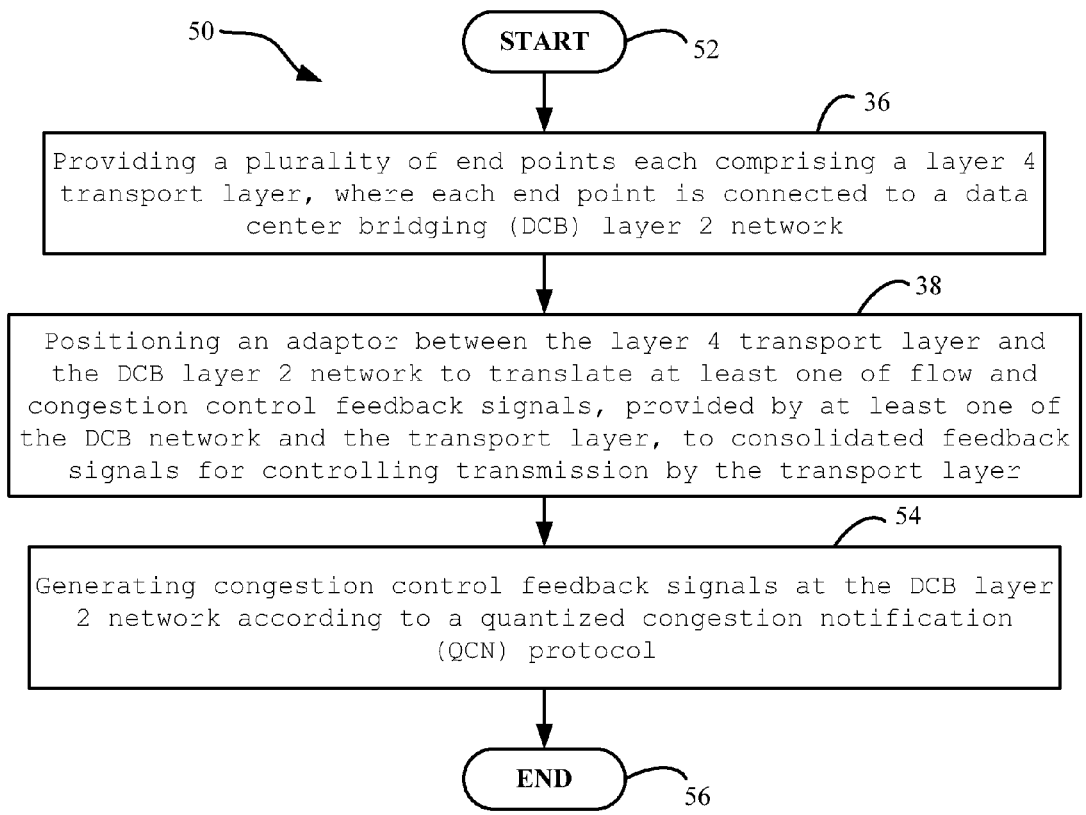
FIG. 4 is a flowchart illustrating method aspects according to the method of FIG. 2.

In another method embodiment, which is now described with reference to flowchart 50 of FIG. 4, the method begins at Block 52. The method may include the steps of FIG. 2 at Blocks 36 and 38. The method may additionally include generating congestion control feedback signals at the DCB layer 2 network according to a quantized congestion notification (QCN) protocol at Block 54. The method ends at Block 56.

Figure 5:
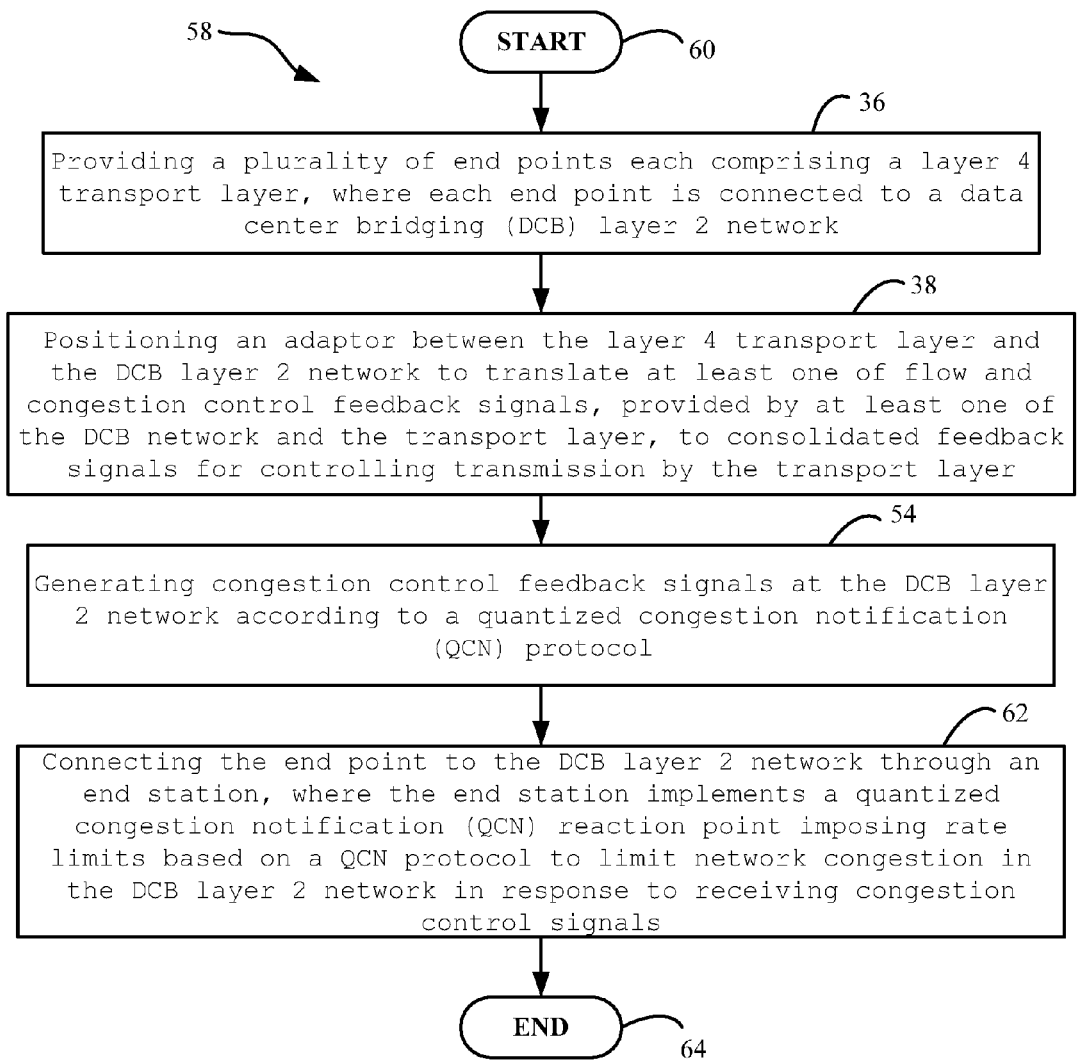
FIG. 5 is a flowchart illustrating method aspects according to the method of FIG. 4.

In another method embodiment, which is now described with reference to flowchart 58 of FIG. 5, the method begins at Block 60. The method may include the steps of FIG. 4 at Blocks 36, 38, and 54. The method may also include connecting the end point to the DCB layer 2 network through an end station, where the end station implements a quantized congestion notification (QCN) reaction point imposing rate limits based on a QCN protocol to limit network congestion in the DCB layer 2 network in response to receiving congestion control signals at Block 62. The method ends at Block 64.

Figure 6:
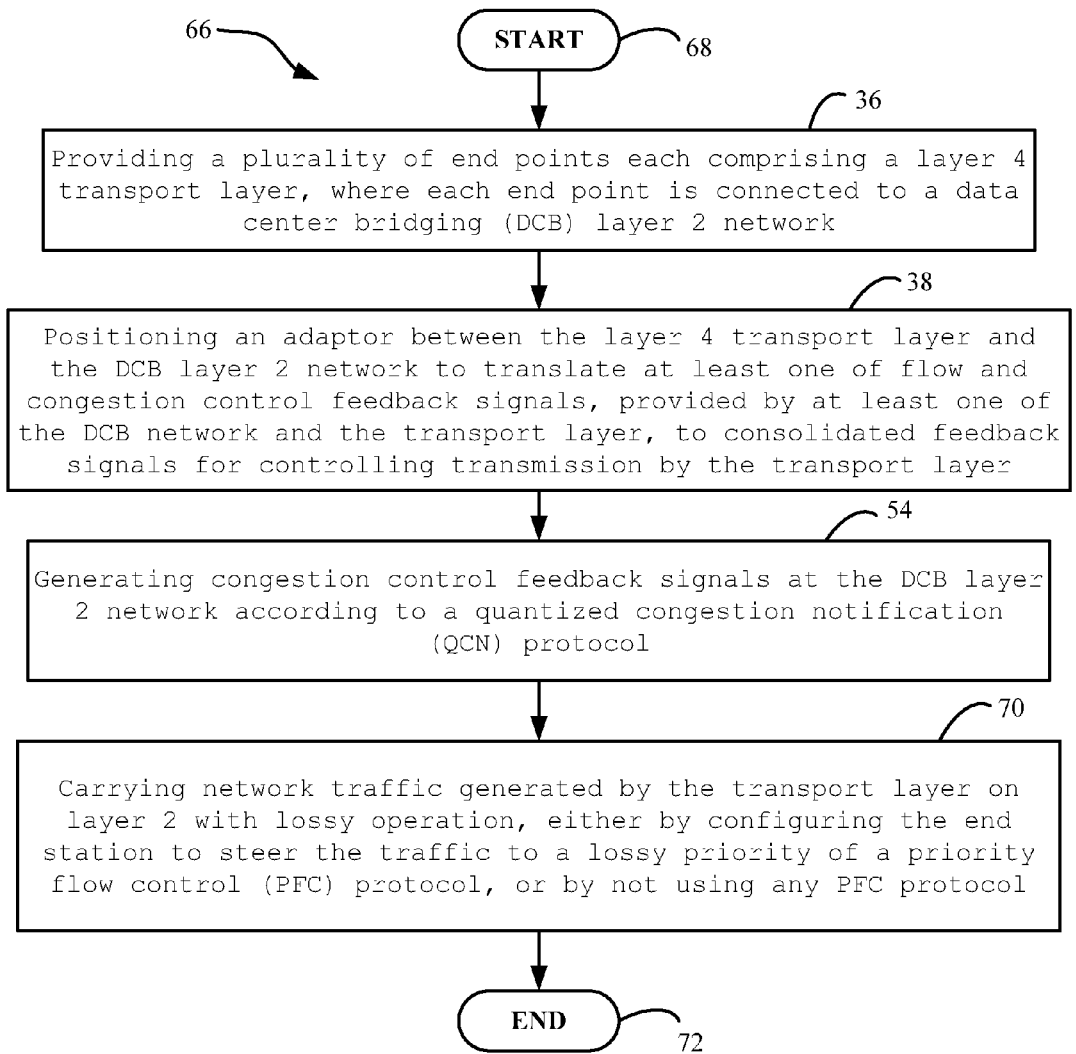
FIG. 6 is a flowchart illustrating method aspects according to the method of FIG. 4.

In another method embodiment, which is now described with reference to flowchart 66 of FIG. 6, the method begins at Block 68. The method may include the steps of FIG. 4 at Blocks 36, 38, and 54. The method may further include carrying network traffic generated by the transport layer on layer 2 with lossy operation, either by configuring the end station to steer the traffic to a lossy priority of a priority flow control (PFC) protocol, or by not using any PFC protocol at Block 70. The method ends at Block 72.

Figure 7:
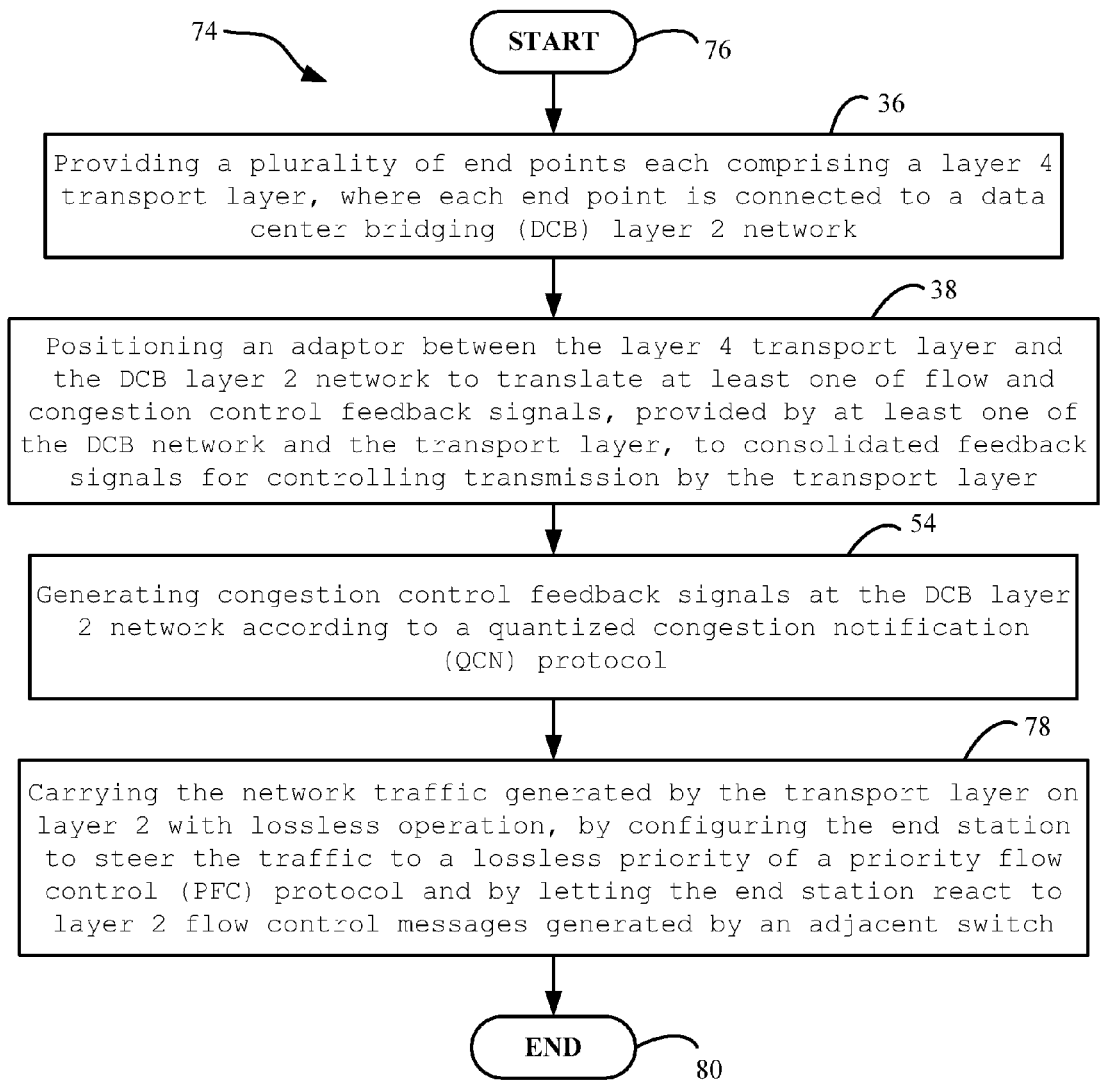
FIG. 7 is a flowchart illustrating method aspects according to the method of FIG. 4.

In another method embodiment, which is now described with reference to flowchart 74 of FIG. 7, the method begins at Block 76. The method may include the steps of FIG. 4 at Blocks 36, 38, and 54. The method may additionally include carrying the network traffic generated by the transport layer on layer 2 with lossless operation, by configuring the end station to steer the traffic to a lossless priority of a priority flow control (PFC) protocol and by letting the end station react to layer 2 flow control messages generated by an adjacent switch at Block 78. The method ends at Block 80.

Figure 8:
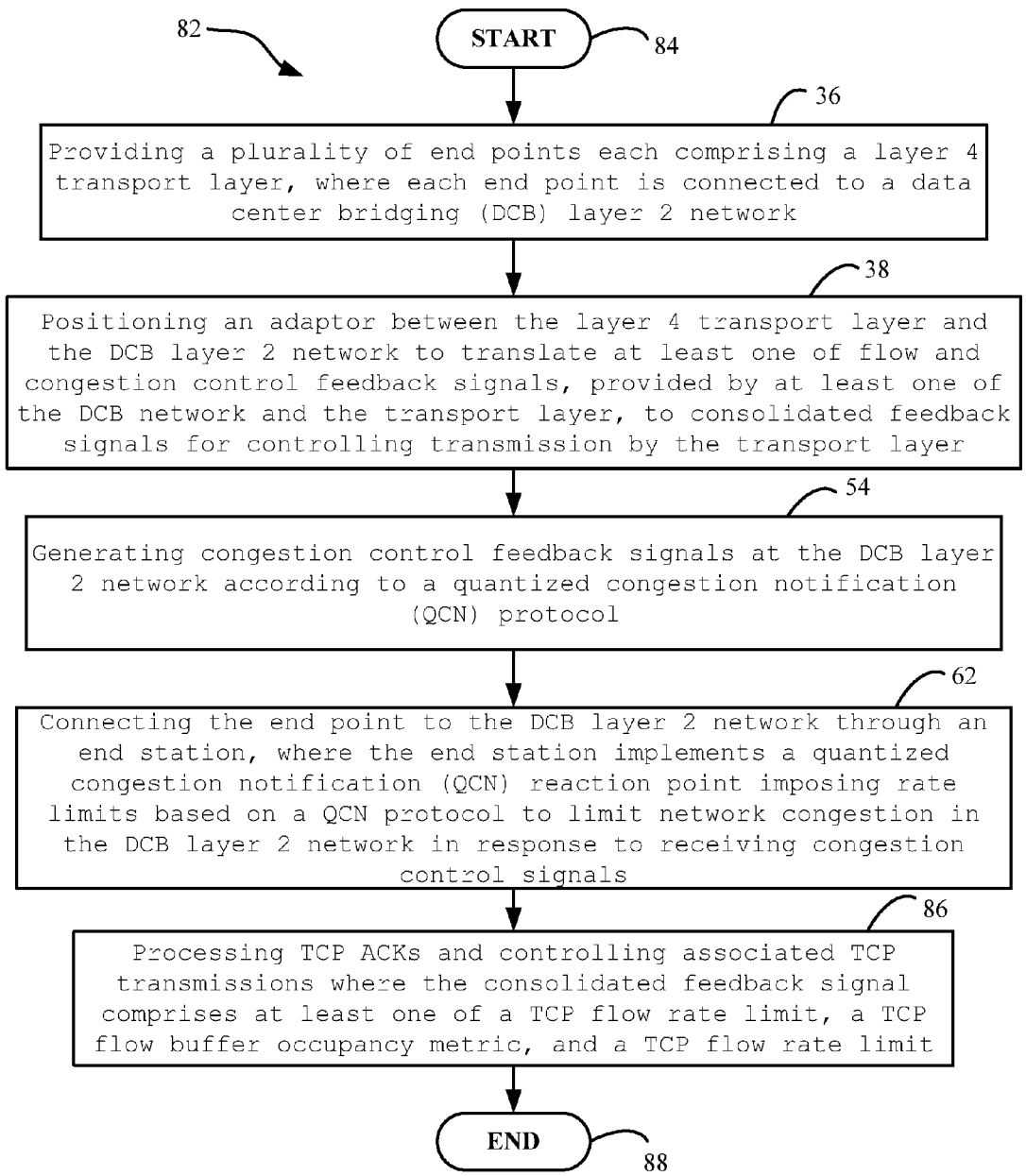
FIG. 8 is a flowchart illustrating method aspects according to the method of FIG. 5.

In another method embodiment, which is now described with reference to flowchart 82 of FIG. 8, the method begins at Block 84. The method may include the steps of FIG. 5 at Blocks 36, 38, 54, and 62. The method may also include processing TCP ACKs and ECNs and controlling associated TCP transmissions where the consolidated feedback signal comprises at least one of a TCP flow rate limit, a TCP flow buffer occupancy metric, and a TCP flow rate limit at Block 86. The method ends at Block 88.

Figure 9:
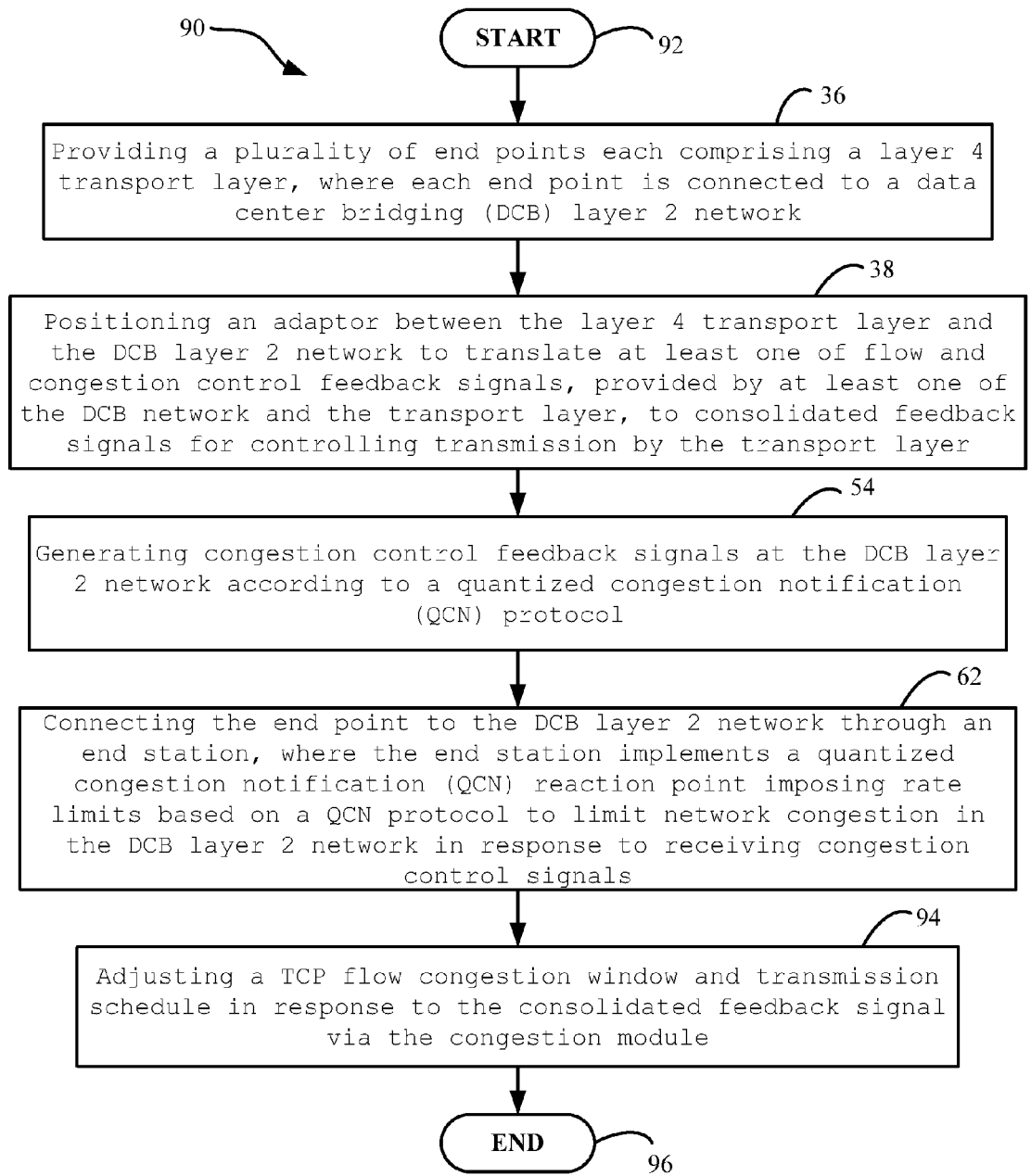
FIG. 9 is a flowchart illustrating method aspects according to the method of FIG. 5.

In another method embodiment, which is now described with reference to flowchart 90 of FIG. 9, the method begins at Block 92. The method may include the steps of FIG. 5 at Blocks 36, 38, 54, and 62. The method may further include adjusting a TCP flow congestion window and transmission schedule in response to the consolidated feedback signal via the congestion module at Block 94. The method ends at Block 96.

Another aspect of the invention is a computer readable program codes coupled to tangible media to address reliability in a converged Ethernet network 12. The computer readable program codes may be configured to cause the program to provide a plurality of end points 14a-14n each comprising a layer 4 transport layer 16a-16n respectively, where each end point is connected to a data center bridging (DCB) layer 2 network 18. The computer readable program codes may also position an adaptor 20 between the layer 4 transport layer 16a-16n and the DCB layer 2 network 18 to translate at least one of flow and congestion control feedback signals, provided by at least one of the DCB network and the transport layer, to consolidated feedback signals for controlling transmission by the transport layer.

In view of the foregoing, the system 10 provides reliability in a Converged Enhanced Ethernet network. For example, current saturation Converged Enhanced Ethernet (CEE) data center networks (DCN) suffer from tree congestion in the CEE/DCN. CEE datacenters allow high link speeds and short delays while introducing lossless operation (and lossless traffic classes) by the means of link layer flow control (LL-FC, aka PFC in CEE) beyond the traditional lossy operation (lossy traffic classes). However, in contrast to the traditional Ethernet and Internet, the lossless operation of CEE introduces new challenges, such as deadlocks and saturation tree congestion. Namely, a single hotspot saturation tree congestion can cause a total DCN collapse within a few 10 s-100 s of us.

Figure 10:
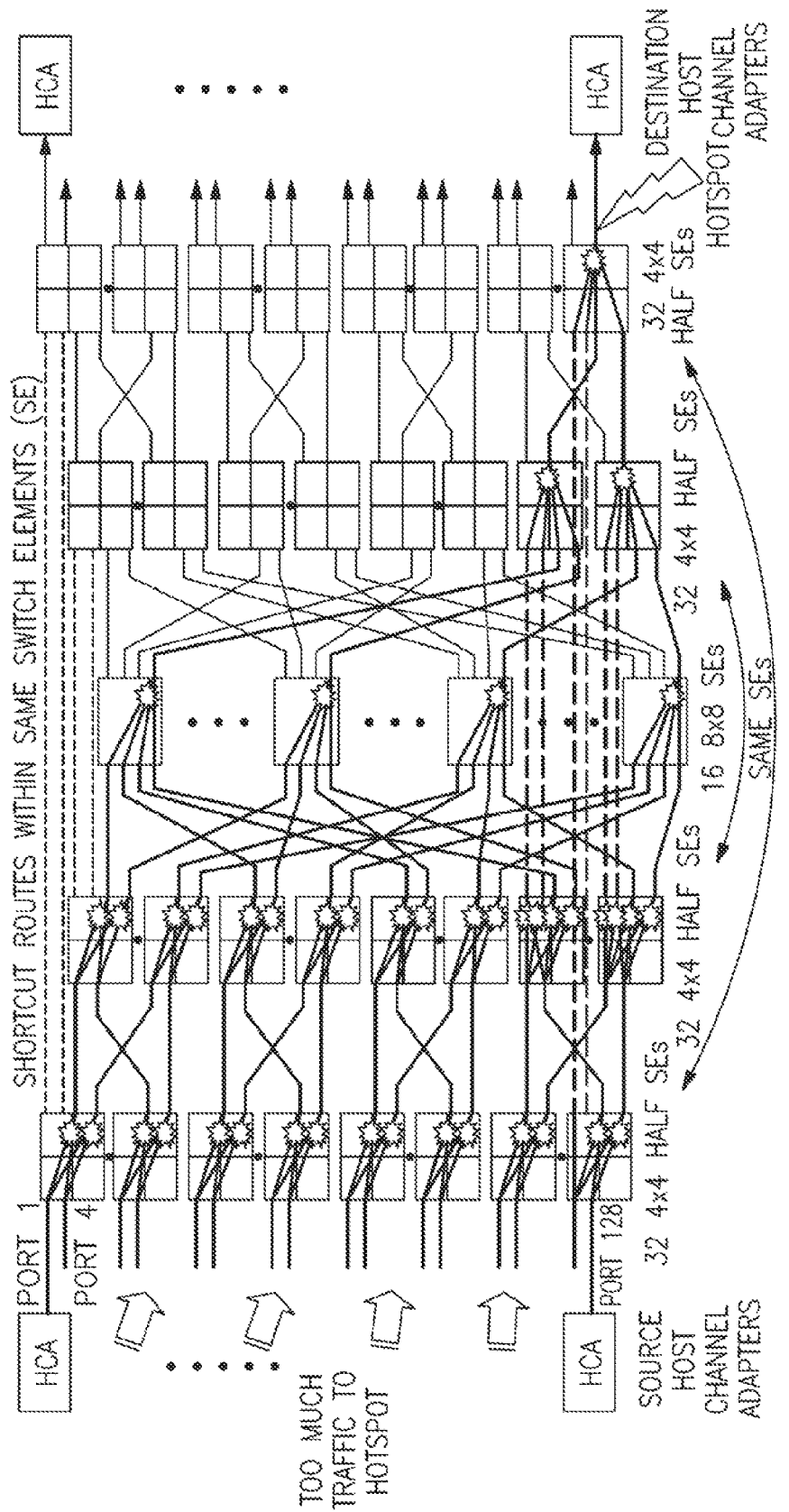
FIG. 10 illustrates a prior art hotspot saturation tree in a 5-stage fat tree.

FIG. 10 illustrates the problem (hotspot congestion box). If a sufficient fraction of all the inputs' traffic targets one of the outputs (in the figure, the output labeled 128), that output link can saturate: it becomes a hotspot (HS) that causes the queues in the switch feeding that link to fill up. If the traffic pattern persists, then, no matter what techniques are used to reassign buffer space, it is all ultimately exhausted. This forces that switch's LL-FC to quickly throttle back all the inputs feeding that switch. That in turn causes the previous stage to fill its buffer space. In a domino effect, the congestion eventually backs up all the way to the network inputs. This has been called tree saturation or, in other contexts, high-order Head of Line (HOL) blocking congestion spreading.

Ultimately, the traffic causing the hotspot will root one or more saturation trees partly caused by the inherent traffic distribution and partly by flow interference or high-order HOL blocking. Once the tree of saturated switches is fully formed, every packet must cross at least one saturated switch. As the time to exit a queue grows exponentially the further a switch is from the hot destination, a majority of the delay is incurred even if only a single switch must be crossed. Hence, the network as a whole suffers a catastrophic loss of throughput: Its aggregate throughput is gated by the throughput of the single hot output.

Saturation spreads very quickly via LL-FC; according to gathered data, the tree is filled in less than 10 traversal times of the network, far too quickly for software to react in time to the problem. Naturally, the problem also dissipates slowly because all the queues involved must be emptied. Hence, a hardware solution is required that reacts quickly enough to keep the tree from growing large. Clearly the network topology is irrelevant to this effect; saturation trees can be induced in any DCN topology.

Thus, lossless LL-FC offers substantial performance benefits, albeit it has the drawback, besides its complexity, of facilitating saturation tree congestion. Unless an efficient CM protocol is designed and implemented to control the fabric operation just below the saturation region and recover from the occasional crossovers, lossless ICTNs such as CEE-based DCNs will be increasingly exposed to saturation trees and congestion collapse. However, while the problem is long outstanding definitive solutions are not yet practically available. The first attempts in the CEE context were done in IEEE 802.1Qau, by using the QCN mechanism against simple (single bottleneck), yet persistent, hotspot congestion.

Why not rely on a widely deployed solution such as transmission control protocol (TCP)? The answer is that DCNs and their congestion phenomena are sufficiently different from the Ethernet (aka Best Effort) and Internet Protocol (IP) networks to invalidate the direct transfer of TCP (even if ECN is added)—that is, without major adaptations—to the DCN environment. The main three reasons are: Losslessness: TCP has been designed to operate based on loss; packet drops are the basic feedback mechanism which triggers the source reaction. Packet loss, however, contradicts CEE's principles.

Next, recovery is very/too slow whenever the TCP window is smaller than 6 packets. In smaller ICTNs with large MTUs the TCP window size is mostly <6 packets. Conversely, if the recovery is too aggressive, performance may decrease 10-fold. This has been recently validated by the TCP Incast papers.

Double feedback loop: Unlike TCP in IP networks, FCC mechanisms in DCNs are based on a dual closed-loop control system: (i) LL-FC (PFC) and (ii) end-to-end CM (either QCN, or TCP, or both). The former is the smaller and faster loop taking care of LL correctness and, sometimes, performance like e.g. advanced scheduling [ETS]. CM involves a larger and slower loop with much longer time constants than the LL RTT; a complete CM solution may include congestion avoidance/prevention and control (after it happens). Since CM is inherently slower than its underlying LL-FC loops, it needs an aggregated view of the ICTN status—whereas the LL-FC relies only on local status. Thus CM should compensate the inertia of its larger loop by (a) acquiring global view. Feedback (QCN CNM, TCP ECNs, Vegas' delays etc.) about traffic conditions and (b) elaborating a more complex source reaction that considers the outdated global view and ideally, tries to predict the traffic based on the trends acquired so far. Problem is that TCP does not assume the existence of a fast and lossless LL-FC layer; nor does TCP coexist well with other flow control schemes (QCN), as proven by TCP over ATM/ABR.

Figure 11:
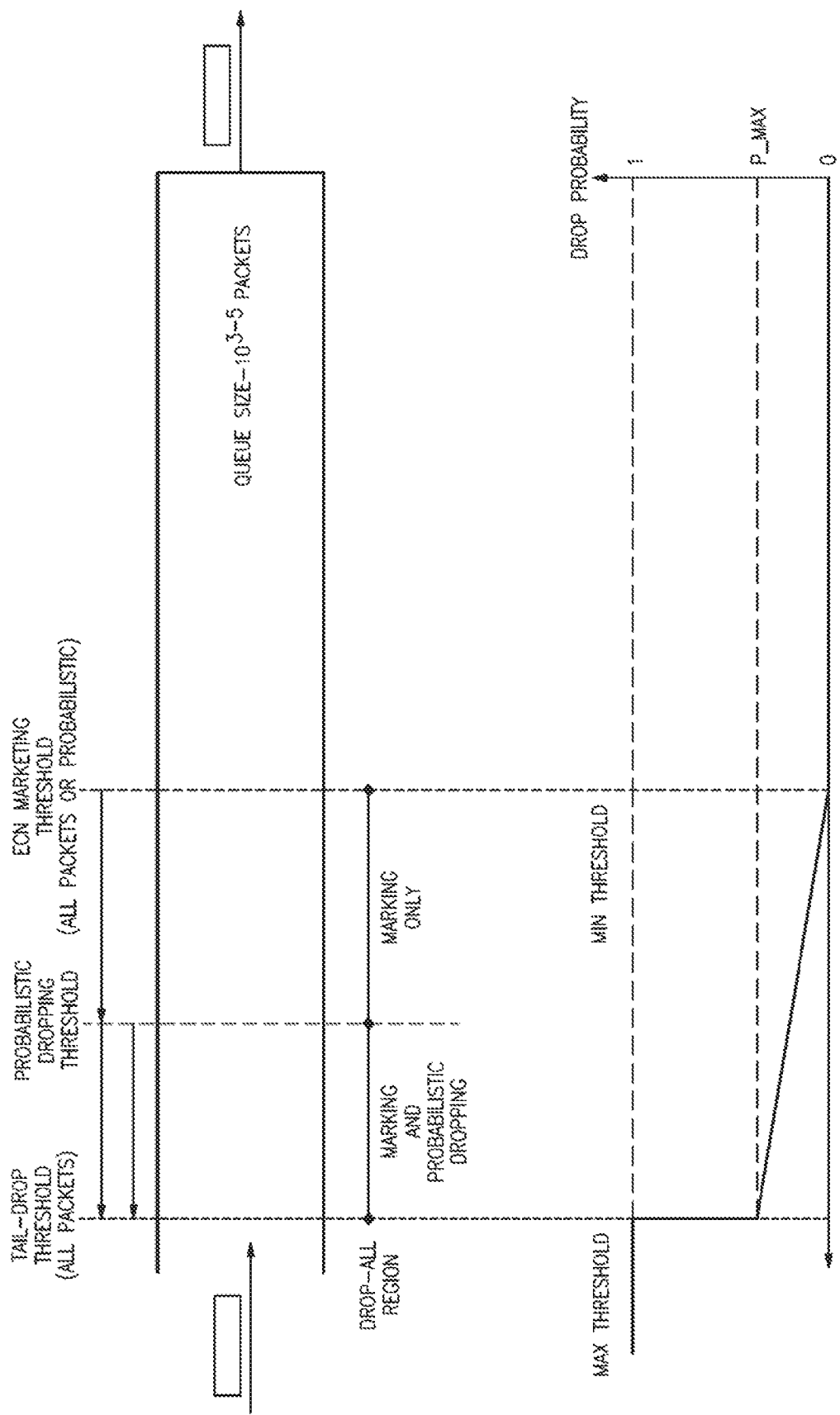
FIG. 11 illustrates explicit congestion notification buffering size in the prior art.

Shallow buffers: The alternative would be to over-design the switch buffers beyond the size mandated for lossless ICTNs. This, however, is not practically possible (see FIG. 11), but also aggravates the post-congestion phase by slowing its recovery. Whereas TCP (and ABR) were extensively studied and improved for BE networks, we still lack conclusive evidence of their applicability and sufficiency in ICTNs. Furthermore, recent research invalidates TCP's use for certain types of middleware, as well as the TCP Incast.

TCP was designed in early 80s to curb single bottleneck congestion in lossy BE networks with e2e lags of 100 s of ms and 10 s of MB switch buffers. By contrast, a CEE-based DCN is lossless (hence multi-bottleneck saturation tree congestion), fast (lags of 0.5-50 us) and shallow (10-100 s KB) buffers.

In response, system 10 uses the following changes/enhancements to TCP, resulting in "DC-TCP": 1) Employ a software and/or hardware version of TCP, such as (CU)BIC, Reno, Vegas, Compound etc. in the end nodes.

2) Disable QCN's controller, if present. Future CEE DCN will implement native L2 CM, i.e. QCN (see 802.1Qau in [42]). Retain the QCN congestion detection, while disabling the QCN rate limiter in the source.

3) Congestion signaling and TCP rate limiter: Replace or complement the traditional TCP rate limiter based on duplicate ACKs with a hybrid rate limiter based on backward congestion notifications (BCNs) and QCN congestion notification messages (CNMs). Feed a digested form of CNMs associated with the TCP source into TCP for window control based on L2 feedback.

4) Detect and compensate for saturation tree. Retune the TCP constants (e.g. RTO) based on the DCN topology and size. Potentially adapt to changing network size and delay in real time (optional, via delay probing or Feedback Request protocol).

One challenge will be that congestion may occur in an external Ethernet network that may be lossy, in which case congestion may result in packet loss and ensuing duplicate ACKs from the TCP receiver. This is about interoperability of DC-TCP with TCP in the external network. Hence the need for a hybrid rate limiter that understands BCNs, digested CNMs, as well as duplicate ACKs.

In case of a DC-TCP sender and a TCP receiver in a lossy network, the TCP receiver will report congestion/loss in the lossy network via duplicate ACKs. In case of a TCP sender in a lossy network and congestion occurring in a lossless network leading to the DC-TCP receiver, the CNMs sent towards the source must be appropriately translated at the boundary between the lossless and the lossy networks. One possibility is to convert CNMs to TCP window scalings in the boundary switch, as CNMs will not be understood by the lossy network.

Figure 12:
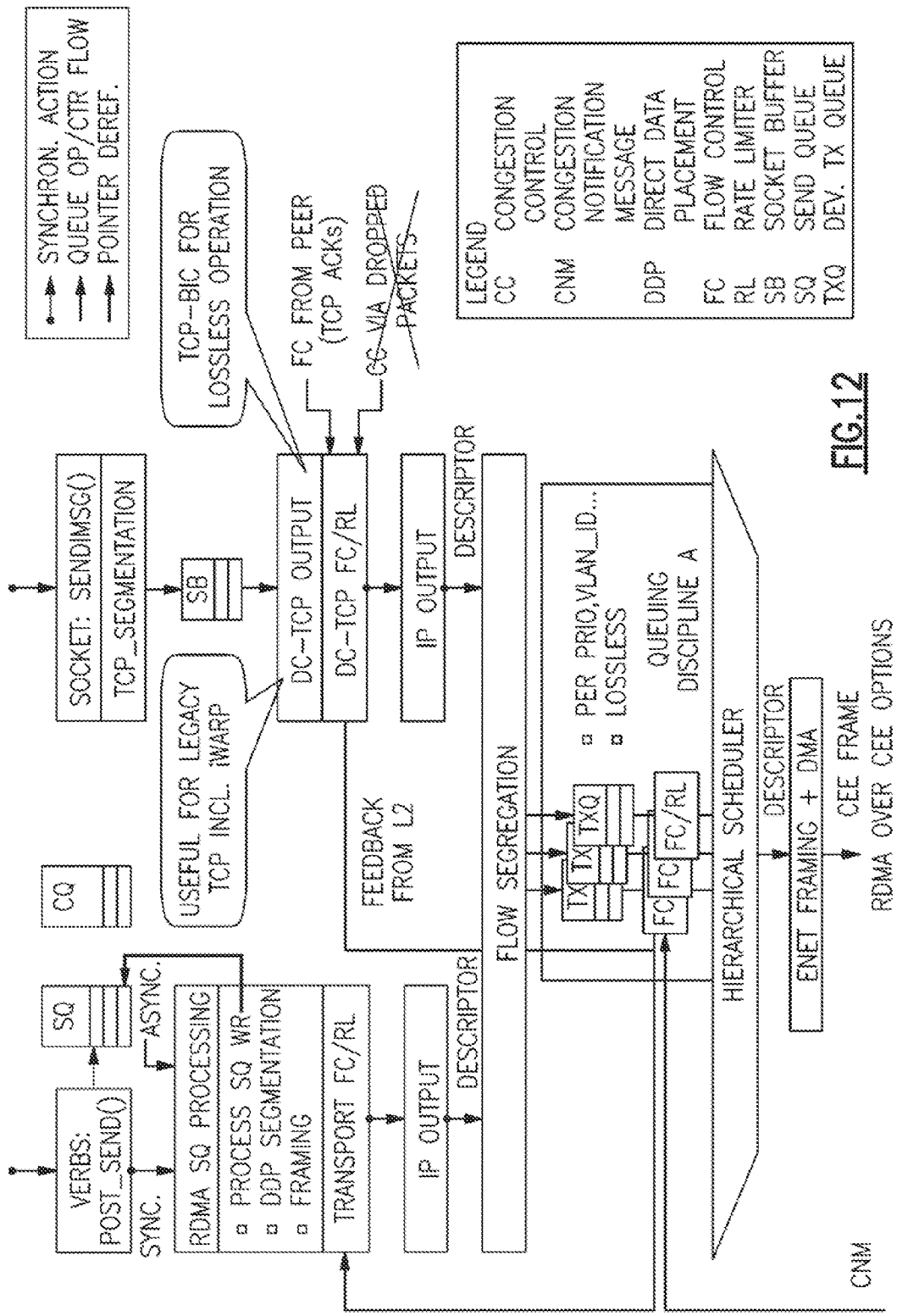
FIG. 12 is a block diagram illustrating an alternative Converged Enhanced network embodiment in accordance with the invention.

While dozens of TCP flavors have been published, generally they deal with fast WANs (same rate as DCNs, but long delays) or wireless applications. Lossless apps of TCP, dealing with saturation trees (multiple correlated bottlenecks) and also working with shallow buffers are not known thus far. Furthermore, TCP has not yet been combined with L2 congestion detection mechanisms such as QCN, which provides a multi-bit (ECN/BCN is commonly binary) quantitative feedback. To effectively curb DCN congestion, optionally we additionally (may) apply the compensation scheme described above. FIG. 12 illustrates one embodiment of system 10.

System 10 adapts TCP to a lossless DCN, by combining a re-tuned TCP flavor (CUBIC, Compound and New Reno are favored, others may apply) with L2 QCN signaling. System 10 copes with saturation trees issues, us latency, and shallow buffers.

System 10 also compensates and adapts to rapidly changing DCN loads. System 10 provided full TCP socket compatibility, and therefore legacy application support.

In a CEE-based data center network 12, a method for preventing the spread of packet congestion while simultaneously preventing packet loss in the network having at least one source channel adapter, at least one destination channel adapter, and multiple fiber channel over Ethernet (FCoE) enabled switches 24 is enabled by system 10. The system 10 detects congestion occurring within the data center network. The system 10 measures the extent of the congestion and generates a feedback signal (value) at the Layer 2 level, notifying the source channel adapter and destination channel adapter that congestion is occurring. The system 10 also compensates for that congestion by changing the packet injection rate (within a sliding window) by an amount proportional to the magnitude of the feedback signal and dynamically readjusts the feedback signal (value) based on the extent of congestion.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
providing a plurality of end points each comprising a layer 4 transport layer, where each end point is connected to a data center bridging (DCB) layer 2 network;
positioning an adaptor between the layer 4 transport layer and the DCB layer 2 network to translate at least one of flow and congestion control feedback signals between a lossless network and a lossy network, provided by at least one of the DCB network and the transport layer, to consolidated feedback signals for controlling transmission by the transport layer;
generating congestion control feedback signals at the DCB layer 2 network according to a quantized congestion notification (QCN) protocol;
connecting the end point to the DCB layer 2 network through an end station, where the end station implements a quantized congestion notification (QCN) reaction point imposing rate limits based on a QCN protocol to limit network congestion in the DCB layer 2 network in response to receiving congestion control signals; and
carrying network traffic generated by the transport layer on layer 2 with lossy operation, either by configuring the end station to steer the traffic to a lossy priority of a priority flow control (PFC) protocol, or by not using any PFC protocol.

2. The method of claim 1 further comprising generating flow control signals at the DCB layer 2 network according to a flow control protocol supporting multiple priorities, such as Priority Flow Control (PFC).

3. The method of claim 1 further comprising carrying the network traffic generated by the transport layer on layer 2 with lossless operation, by configuring the end station to steer the traffic to a lossless priority of a priority flow control (PFC) protocol and by letting the end station react to layer 2 flow control messages generated by an adjacent switch.

4. The method of claim 1 further comprising processing TCP ACKs and controlling associated TCP transmissions where the consolidated feedback signal comprises at least one of a TCP flow rate limit, a TCP flow buffer occupancy metric, and a TCP flow rate limit.

5. The method of claim 1 further comprising adjusting a TCP flow congestion window and transmission schedule in response to the consolidated feedback signal via the congestion module.

6. A system comprising:
a plurality of end points, each end point comprising a memory and processor, each end point comprising a layer 4 transport layer, where each end point is connected to a data center bridging (DCB) layer 2 network; and
an adaptor between the layer 4 transport layer and the DCB layer 2 network to translate at least one of flow and congestion control feedback signals provided by at least one of the DCB network and the transport layer between a lossless network and a lossy network, to consolidated feedback signals for controlling transmission by the transport layer;
wherein the DCB layer 2 network generates congestion control feedback signals according to a quantized congestion notification (QCN) protocol;
wherein the end point is connected to the DCB layer 2 network through an end station, where the end station implements a quantized congestion notification (QCN) reaction point imposing rate limits based on a QCN protocol to limit network congestion in the DCB layer 2 network in response to receiving congestion control signals; and
wherein the network traffic generated by the transport layer is carried on layer 2 with lossy operation, either by configuring the end station to steer the traffic to a lossy priority of a priority flow control (PFC) protocol, or by not using any PFC protocol.

7. The system of claim 6 wherein the DCB layer 2 network generates flow control signals according to a flow control protocol supporting multiple priorities.

8. The system of claim 6 wherein the network traffic generated by the transport layer is carried on layer 2 with lossless operation, by configuring the end station to steer the traffic to a lossless priority of a priority flow control (PFC) protocol and by letting the end station react to layer 2 flow control messages generated by the adjacent switch.

9. The system of claim 6 wherein the network traffic generated by the transport layer is carried on layer 2 with lossy operation, either by configuring the end station to steer the traffic to a lossy priority of a priority flow control (PFC) protocol, or by not using any PFC protocol.

10. The system of claim 6 wherein the network traffic generated by the transport layer is carried on layer 2 with lossless operation, by configuring the end station to steer the traffic to a lossless priority of a priority flow control (PFC) protocol and by letting the end station react to layer 2 flow control messages generated by an adjacent switch.

11. The system of claim 6 wherein the adaptor preprocesses the flow and congestion control feedback signals into consolidated feedback signals, with the preprocessing including at least one of delaying, aggregating, filtering, replicating, enhancing and decimating the primary feedback signals.

12. A computer program product embodied in a non-transitory storage medium comprising:
computer readable program codes coupled to the non-transitory storage medium to improve reliability of a converged Ethernet network, the computer readable program codes configured to cause the program to:
provide a plurality of end points each comprising a layer 4 transport layer, where each end point is connected to a data center bridging (DCB) layer 2 network; and
position an adaptor between the layer 4 transport layer and the DCB layer 2 network to translate at least one of flow and congestion control feedback signals, provided by at least one of the DCB network and the transport layer between a lossless network and a lossy network, to consolidated feedback signals for controlling transmission by the transport layer;
generate congestion control feedback signals at the DCB layer 2 network according to a quantized congestion notification (QCN) protocol;
connect the end point to the DCB layer 2 network through an end station, where the end station implements a quantized congestion notification (QCN) reaction point imposing rate limits based on a QCN protocol to limit network congestion in the DCB layer 2 network in response to receiving congestion control signals; and
carry network traffic generated by the transport layer on layer 2 with lossy operation, either by configuring the end station to steer the traffic to a lossy priority of a priority flow control (PFC) protocol, or by not using any PFC protocol.

13. The computer program product of claim 12 further comprising program code configured to: generate flow control signals at the DCB layer 2 network according to a flow control protocol supporting multiple priorities, such as Priority Flow Control (PFC).

14. The computer program product of claim 12 further comprising program code configured to: carrying the network traffic generated by the transport layer on layer 2 with lossless operation, by configuring the end station to steer the traffic to a lossless priority of a priority flow control (PFC) protocol and by letting the end station react to layer 2 flow control messages generated by an adjacent switch.

15. The computer program product of claim 12 further comprising program code configured to: processing TCP ACKs and controlling associated TCP transmissions where the consolidated feedback signal comprises at least one of a TCP flow rate limit, a TCP flow buffer occupancy metric, and a TCP flow rate limit.

16. The computer program product of claim 12 further comprising program code configured to: adjusting a TCP flow congestion window and transmission schedule in response to the consolidated feedback signal via the congestion module.

* * * * *